United States Patent [19]

Spain

[11] Patent Number: 4,535,813

[45] Date of Patent: Aug. 20, 1985

[54] SOLAR ENERGY OPERATED IRRIGATION SURGE VALVE

[76] Inventor: Robin L. Spain, Drawer U, Olton, Tex. 79064

[21] Appl. No.: 662,510

[22] Filed: Oct. 19, 1984

[51] Int. Cl.³ ............................................. F16K 11/00
[52] U.S. Cl. .................................. 137/625.5; 137/872; 251/250
[58] Field of Search ............................ 137/872, 625.5; 251/250, 77, 80

[56] References Cited

U.S. PATENT DOCUMENTS

| | | | |
|---|---|---|---|
| 916,403 | 3/1909 | Adamson | 137/625.5 |
| 2,778,371 | 1/1957 | Dannevig | 137/625.5 |
| 3,180,358 | 4/1965 | Cogdell | 137/625.5 |
| 3,779,280 | 12/1973 | Evans et al. | 137/625.5 |
| 4,026,267 | 5/1977 | Coleman | 126/440 |

*Primary Examiner*—James C. Yeung
*Attorney, Agent, or Firm*—Harvey B. Jacobson

[57] ABSTRACT

A valve body is provided having axially spaced annular valve seats defining fluid outlets for the body. The body includes an inlet opening into the interior thereof between the seats and a disc valve is supported within the body for axial shifting between the seats. A drive mechanism for the valve disc is drivingly connected thereto and is operative to slowly shift the valve disc from one seat toward engagement with the other seat. The drive mechanism includes a reversible electric motor, a timer, a storage battery and a solar panel for recharging the storage battery. The timer alternately operates the motor in opposite directions whereby the valve disc is shifted back and forth between seated engagement with the axially spaced valve seats.

8 Claims, 5 Drawing Figures

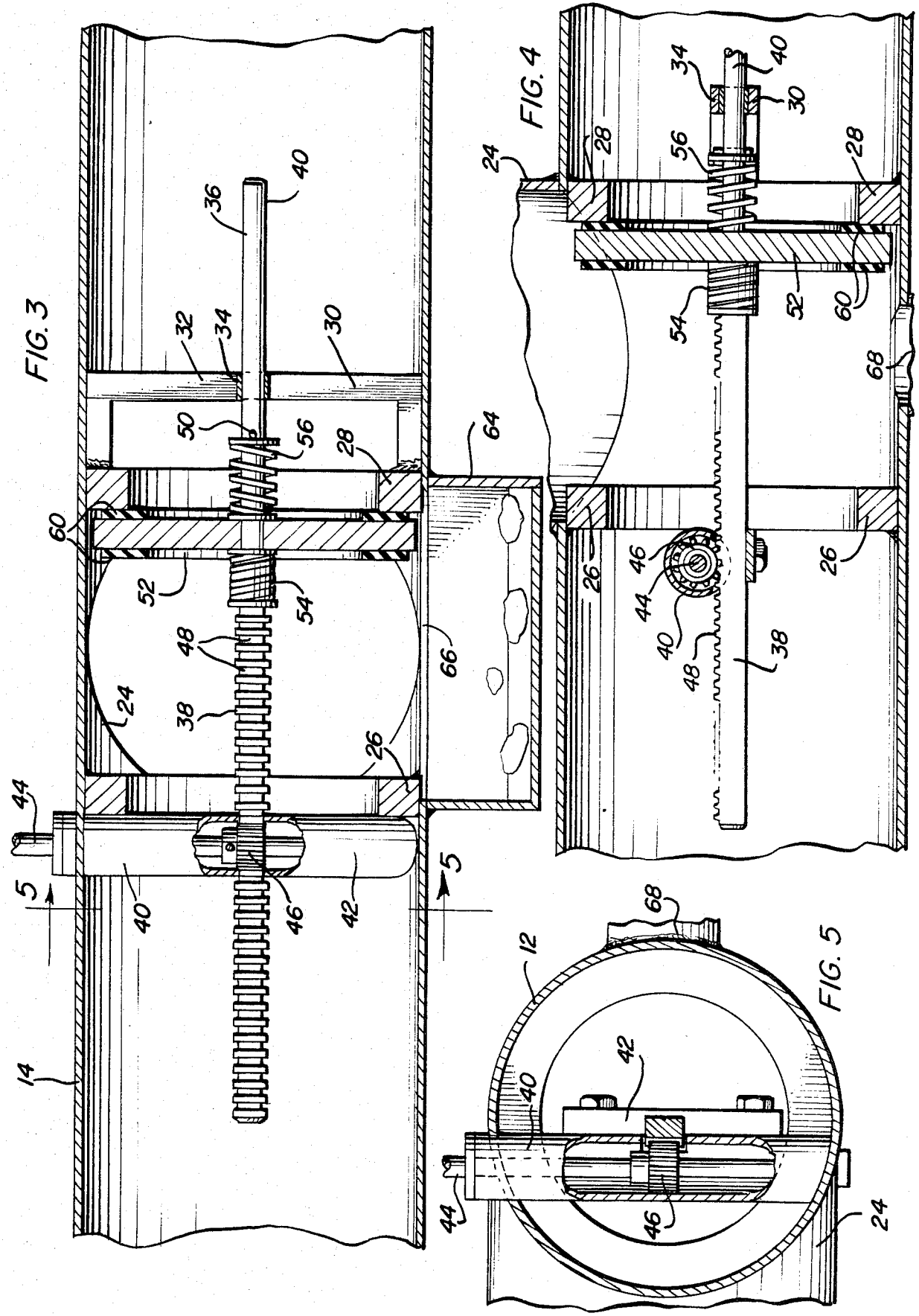

SOLAR ENERGY OPERATED IRRIGATION SURGE VALVE

BACKGROUND OF THE INVENTION

1. Field of the Invention

This invention relates to a programmable, repeating cycle and electrically actuated fluid handling valve including a reciprocating valve element and which sequentially and progressively opens and closes a plurality of ports responsive to reciprocation of the valve element. The valve is specifically designed to function as an irrigation surge valve and includes a battery pack and timer for timed electrical operation of the valve, a solar cell being also provided for recharging the battery pack.

2. Description of the Related Art

Various different forms of electrically controlled and programmable timed valves heretofore have been provided as well as other forms of valves including some of the general structural and operational features of the instant invention. Examples of some of these previously known forms of valves are disclosed in U.S. Pat. Nos. 645,696, 916,403, 1,974,335, 2,005,891, 2,327,959, 2,598,062, 3,180,358, 4,003,402 and 4,150,685.

SUMMARY OF THE INVENTION

The valve of the instant invention comprises a surge valve having a rack and pinion drive assembly for reciprocally shifting a valve member between two outlet seats. The rack and pinion drive assembly includes an electric drive motor to which electrical current is supplied from a battery pack and the battery pack is recharged by a solar cell. The valve member, when being driven by the drive assembly, moves slowly from one seat toward the other seat and the movement of the valve member between the two seats is relatively slow and the valve thereby functions to gradually open one outlet of the valve while gradually closing the other outlet of the valve. This prevents pressure surges and sudden thrusts of water from the valve seat being opened. Further, the valve member includes a lower sump for collecting any large solids which may enter the valve by the flow of water supplied to the valve. The sump is operative to contain a considerable quantity of large solids which might otherwise interfere with shifting of the valve member between the two seats with which the valve member is engageable. Further, the valve member is spring-mounted on the support therefor which supports the valve for movement between the two seats and the spring-mounting of the valve prevents injury to the drive mechanism for the valve member in the event an obstruction is disposed between the valve member and the seat toward which the valve member is being moved.

The main object of this invention is to provide a lightweight surge valve that can be handled by almost any person.

Another object of this invention is to provide a fully self-contained surge valve-equipped system which requires no external power source.

Yet another important object of this invention is to provide a surge valve having a sump in a lower portion thereof for collection of obstructions which could possibly cause valve malfunction.

Another object of this invention is to provide a surge valve including a valve member shiftable between opposing valve seats under the control of a drive mechanism which effects shifting of the valve member at a slow rate of speed.

A final object of this invention to be specifically enumerated herein is to provide an irrigation surge valve in accordance with the preceding objects and which will conform to conventional forms of manufacture, be of simple construction and easy to use so as to provide a device that will be economically feasible, long lasting and relatively trouble free in operation.

These together with other objects and advantages which will become subsequently apparent reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

FIG. 3 is an enlarged fragmentary longitudinal vertical sectional view taken substantially upon the plane indicated by the section line 3—3 of FIG. 2;

FIG. 4 is an enlarged fragmentary horizontal sectional view taken substantially upon the plane indicated by the section line 4—4 of FIG. 2; and FIG. 5 is a fragmentary vertical sectional view taken substantially upon the plane indicated by the section line 5—5 of FIG. 3.

DESCRIPTION OF THE PREFERRED EMBODIMENT

Figure 1:
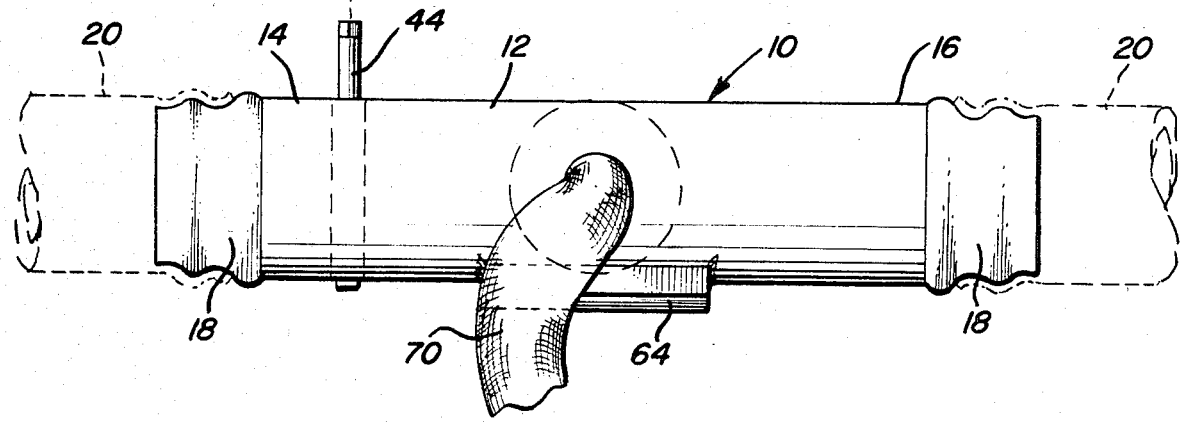
FIG. 1 is a side elevational view of the surge valve of the instant invention with the drive mechanism for the valve member of the valve being schematically illustrated.
Figure 2:
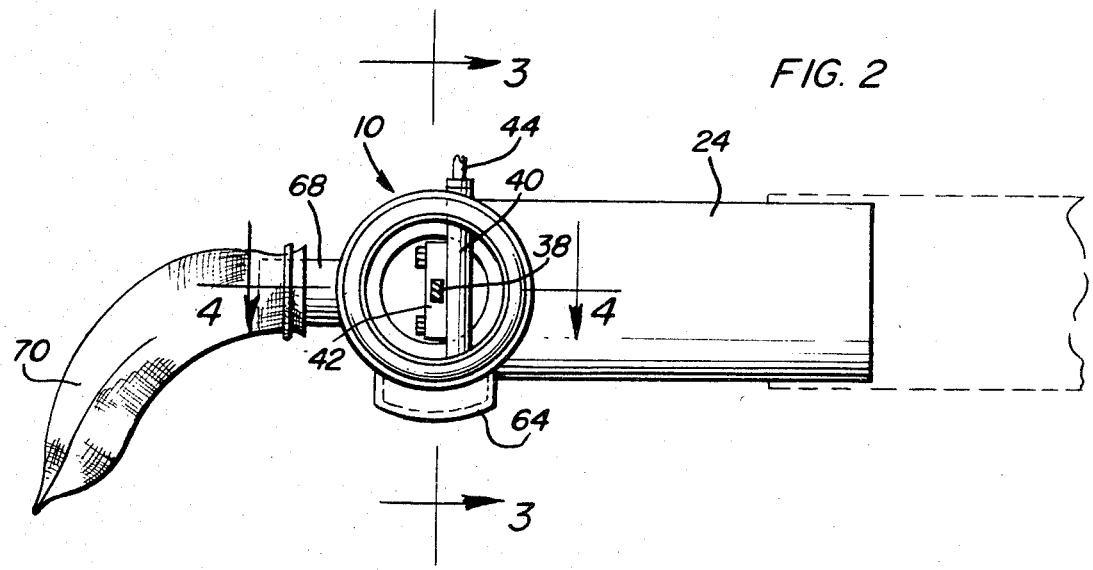
FIG. 2 is an end elevational view of the surge valve as seen from the right side of FIG. 1.

Referring now more specifically to the drawings the numeral 10 generally designates the surge valve assembly of the instant invention. The assembly 10 includes an elongated tubular body 12 including opposite end portions 14 and 16. The terminal ends of the end portions 14 and 16 are specifically shaped as at 18 for releasable coupling to irrigation pipe sections 20 and the longitudinal mid-portion of the body 12 includes a water inlet neck 24 opening into the interior of the hollow body 12.

The end portions 14 and 16 include annular valve seats 26 and 28 secured therein and it may be seen from FIGS. 3 and 4 of the drawings that the inlet neck 24 is disposed between the remote sides of the annular valve seats 26 and 28.

Inasmuch as the body comprises a cylindrical body and the valve seats 26 and 28 comprise annular seats secured within the body 12 in planes disposed normal to the longitudinal centerline of the body 12, the seats 26 and 28 are axially spaced and coaxial.

The end portion 16 includes a U-shaped mount 30 secured therein and mounted from the side of the seat 28 remote from the seat 26. The bight portion 32 of the mount 30 is vertically disposed and includes a central guide sleeve 34 extending therethrough.

An elongated support 36 is provided including a first rectangular cross section end portion 38 and a second cylindrical end portion 40. The end portion 40 is guidingly and slidingly received through the sleeve 34 and the end portion 14 includes an elongated vertically disposed journal assembly 40 from which a guide block 42 is removably supported and the guide block 42 slidably and guidingly supports the end portion 38. The journal assembly 40 comprises a tubular support secured in the body 12 and upwardly through an upper wall portion of the body and the journal assembly 40 rotatably journals a driven shaft 44 therein having a pinion gear 46 mounted thereon. The end portion 38 includes rack gear teeth 48 formed thereon and spaced longitudinally therealong and the pinion gear 46 is meshed with the rack gear teeth 48. Accordingly, upon oscillation of the shaft 44 the elongated support 40 will be longitudinally rectilinearly reciprocated.

The end portion 36 includes a diametric abutment pin 50 secured therethrough intermediate the opposite ends of the end portion 36 and a circular valve disc or element 52 is slidably mounted on the end portion 36 between the pin 50 and the end portion 38. A pair of compression springs 54 and 56 are disposed about the end portion 36 on opposite sides of the valve disc 52. The adjacent ends of the springs 52 and 56 abut the opposing axial faces of the valve disc 52 and the remote ends of the springs 54 and 56 abut against the end portions 38 and the pin 50, respectively. Accordingly, the springs 54 and 56 serve to yieldingly bias the valve disc 52 toward a centered position between the end portion 38 and the pin 50. Further, the valve disc 52 includes opposite axial end outer peripheral resilient annular seals 60 for cushioned fluid-tight sealed engagement with the seats 26 and 28.

The journal assembly 40 and drive shaft 44 project upwardly through the upper portion of the tubular body 12 and the lower portion of the tubular body 12 includes an upwardly opening hollow sump 64 which projects downwardly from the undersurface of the body 12. The sump 64 is in the form of an upwardly opening housing secured about an appropriately shaped opening 66 formed in the underside of the body 12 between the seats 26 and 28. Further, the side of the body 12 remote from the inlet neck 24 includes an outwardly projecting outlet neck 68 of considerably smaller inside cross-sectional area than the inlet 24 and having a water pervious bag-type filter cover 78 secured thereover.

With attention now invited more specifically to FIG. 1 of the drawings it may be seen that the driven shaft 44 projects upwardly from the body 12 and has a reversible electric motor 72 drivingly coupled thereto. The electric motor 72 is supplied operating current through a programmable timer 74 from a gel pack storage battery 76 and a solar panel 78 is operatively connected to the battery 76 for recharging the latter. The timer includes a switching mechanism which reverses the motor 72 each time the motor 72 is actuated by the timer and the time interval between periods of actuation of the motor 72 may be preset at the timer. Also, the motor and timer may be interconnected in such a manner that increased resistance to operation of the motor will be sufficient to terminate operation of the motor. In this manner, the motor 72 may be used to alternately shift the valve disc 52 between positions in seated engagement with the valve seats 26 and 28.

It is extremely important to note that the valve 10 is operative in many inrrigation environments and that it is particularly well adapted for use in an irrigation environment in which the rate of water being supplied to the valve 10 through the inlet neck 24 is not sufficient to alow continued and simultaneous discharge of water from both end portions 14 and 16. If a limited intake of water to the valve 10 is continuously discharged from the end portions 14 and 16 into two sets of furrows, the rate of discharge of water into each furrow may not be sufficient to allow the irrigation water to flow the full length of each furrow. However, through utilization of the surge valve, a full available rate of water flowing to the valve 10 may be initially diverted for irrigating only one set of furrows and then switched for irrigation of a second set of furrows. In this manner, the entire amount of a limited supply of water to the valve 10 may be alternately supplied to two different sets of furrows.

It will be noted that the seats 26 and 28 are mounted in such a manner within the end portions 14 and 16 to prevent communication between the interior of the sump 64 and the end portions 14 an 16 other than through the valve seats 26 and 28. In addition, the valve seats 26 and 28 are further mounted within the body 12 to prevent communication between the inlet neck 24 and the end portions 14 and 16 other than by through the seats 26 and 28.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as new is as follows:

1. An irrigation surge valve including a hollow tubular body defining opposing axially spaced annular outlet seats, said body including an inlet opening into said body intermediate said seats, an elongated support mounted in said body for guided recilinear movement between first and second predetermined positions, a valve disc slidably mounted on said support for shifting therealong between relatively axially displaced limit positions, means operatively connected between said disc and support yieldingly biasing said disc toward an intermediate position on said support between said limit positions, said disc being alternately sealingly engageable with said seats upon alternate shifting of said support between said predetermined positions, reversible motor means operatively connected to said support for shifting said support between said first and second predetermined positions, said body including upper and lower sides and said lower side defining an internal upwardly opening sump communicated with the interior of said body between said seats and disposed below the path of movement of said disc between aid seats, said body further including a third outlet of smaller cross-sectional area than the effective flow cross-sectional area of said outlet seats, said third outlet opening into said body intermediate said seats and generally opposite from said inlet opening, said third outlet being disposed above the level of said sump.

2. The valve of claim 1 wherein said third outlet includes a water pervious bag-type cover filter secured thereover externally of said body.

3. The valve of claim 1 wherein said motor means comprises a reversible electric motor, a control mechanism operatively connected to said motor for controlled operation thereof, said control mechanism including means operative to reversibly operate said motor at variable timed intervals.

4. The valve of claim 3 wherein said control mechanism also includes a storage battery and a solar panel for recharging said battery, said battery being electrically connected to said motor through a timing and switching mechanism.

5. The valve of claim 1 wherein said support includes one end portion thereof provided with rack gear teeth, said motor means being disposed externally of said body and including a rotary output shaft projecting into said body and having a pinion gear mounted thereon method with said rack gear.

6. An irrigation surge valve including a hollow tubular body including longitudinally spaced opposing annular outlet seats, said body including an inlet opening into said body intermediate said seats, a valve disc, mounting means mounting said disc in said body for axial shifting therealong between relatively axially spaced limit positions sealingly engaged with said seats, drive means operatively connected to said disc for shifting said disc between said limit positions, said body including upper and lower sides, said lower side defining an internal upwardly opening sump within said body, between said seats and disposed below the path of movement of said disc between said seats, said mounting means including an elongated support upon which said disc is generally coaxially mounted for limited sliding therealong, first and second support means in said body spaced longitudinally therealong on remote sides of said seats guidingly engaging first and second end portions, respectively, of said elongated support member for guided reciprocation of the latter longitudinally of said tubular body, longitudinally spaced abutment means on said elongated support spaced on opposite sides of said disc, and coiled compression springs disposed on said elongated support member on opposite sides of said disc and between the latter and said abutment means with said springs partially compressed when said disc is centered between said abutment means, said first end portion of said elongated support member including rack gear means extending longitudinally therealong, said drive means including a reversible motor driven pinion gear journalled from said first support means and meshed with said rack gear means.

7. An irrigation surge valve including a hollow tubular body including longitudinally spaced opposing annular annular outlet seats, said body including an inlet opening into said body intermediate said seats, a valve disc, mounting means mounting said disc in said body for axial shifting therealong between relatively axially spaced limit positions sealingly engaged with said seats, drive means operatively connected to said disc for shifting said disc between said limit positions, said body including upper and lower sides, said lower side defining an internal upwardly opening sump within said body, between said seats and disposed below the path of movement of said disc between said seats, said body including a third outlet of smaller cross-sectional area than the effective flow cross-sectional area of said outlet seats, said third outlet opening into said body intermediate said seats and generally opposite from said inlet opening, said third outlet being disposed above the level of said sump.

8. The valve of claim 7 wherein said third outlet includes a water pervious bag-type cover filter secured thereover externally of said body.

* * * * *